UNITED STATES PATENT OFFICE.

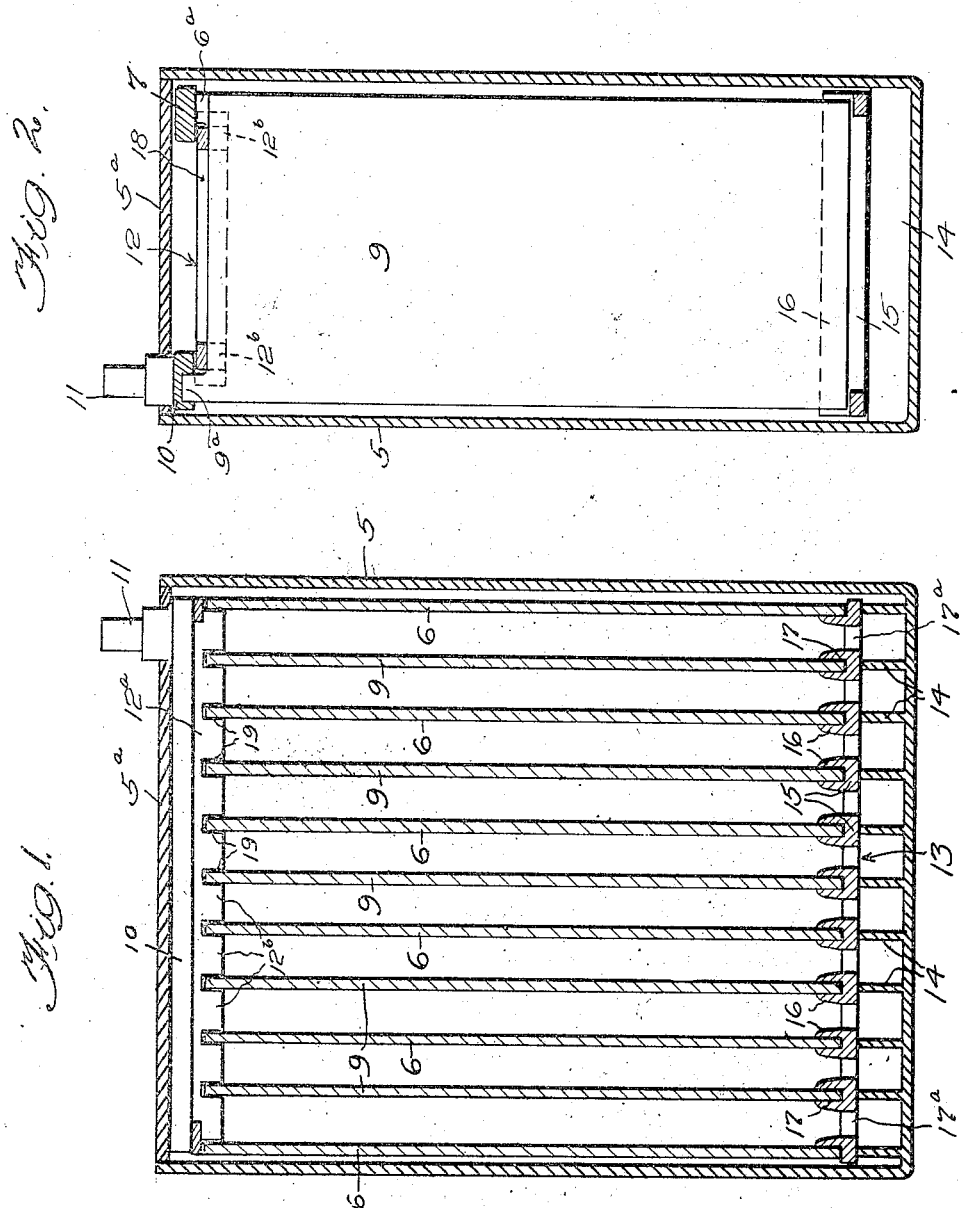

WALTER LAWRENCE GILL, OF SAN BERNARDINO, CALIFORNIA.

ELECTRIC STORAGE BATTERY.

1,371,993.

Specification of Letters Patent.

Patented Mar. 15, 1921.

Application filed April 23, 1920. Serial No. 375,916.

*To all whom it may concern:*

Be it known that I, WALTER LAWRENCE GILL, citizen of the United States, residing at San Bernardino, in the county of San Bernardino and State of California, have invented certain new and useful Improvements in Electric Storage Batteries, of which the following is a specification, reference being had therein to the accompanying drawings.

This invention relates to electric storage batteries capable of use in any relation where a storage battery is needed but more particularly intended for use in the starting, lighting and ignition systems of automobiles.

The battery constituting the subject-matter of the present invention in common with the batteries now upon the market employs alternating spaced, positive and negative plates and a battery jar to receive said plates and to retain an electrolyte, but here the resemblance between my improved battery and the batteries now in use, ceases.

The battery of this application has its plates disposed in a novel manner with respect to each other and with respect to the battery jar. Claims to such novel arrangement of the plates are presented in my co-pending application Serial Number 440,029 filed on the 25th day of January 1921. This application is devoted to the protection of the spacing elements by means of which the plates are held rigidly and without the possibility of movement with respect to each other, in spaced relation, and in such manner that substantially their entire surfaces are exposed to the free action of the electrolyte.

Further objects and advantages of the invention will be set forth in the detailed description which now follows.

In the accompanying drawing—

Figure 1 is a longitudinal vertical section of a battery constructed in accordance with the invention;

Fig. 2 is a transverse vertical section thereof; and

Like numerals designate corresponding parts throughout the several figures of the drawing.

Figure 3:
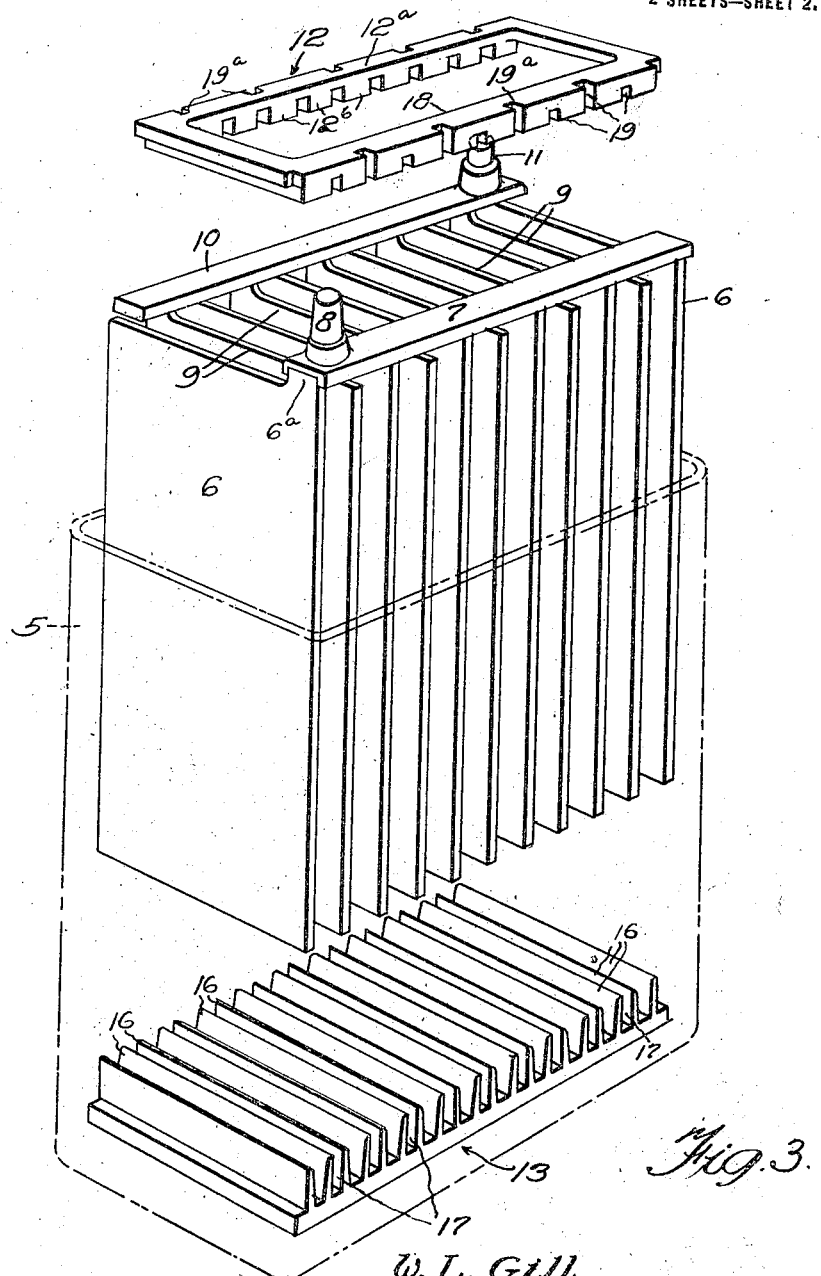
Fig. 3 is a perspective assembly with the parts in slightly separated relation.

In the drawing 5 designates a battery jar of conventional form preferably made of hard rubber but which may be of any suitable material. A series of negative plates 6 is connected to a strap 7 carrying the negative terminal 8 while the series of positive plates 9 is connected to a strap 10 which carries the positive terminal 11.

In storage batteries of conventional form, the plates are arranged to run lengthwise of the battery jar. According to the present invention the plates are disposed transversely of the jar and spaced much farther apart than has heretofore been the practice. In standard batteries the distance between the plates is about one-sixteenth of an inch, while according to my invention the distance between the plates in a one hundred ampere battery will be about seven-sixteenths of an inch. However, it is to be understood that the distance may vary as required. In large batteries the plates will be farther apart than in small batteries.

For holding the plates in properly spaced relation an upper spacing element 12 and a lower spacing element 13 are employed. The lower spacing element 13 rests upon ribs 14 of the battery jar 5 to be held in spaced relation to the bottom of the jar thereby.

The bottom spacing element 13 is composed of a rectangular frame that is spanned by a plurality of bars 15 each of which carries a pair of upstanding lips 16, said lips being spaced to form the plate receiving grooves 17 between them, within which the lower edges of the plates are received. The lips 16 are rounded off or beveled to direct sediment downwardly between the bars 15 and through openings 17 formed between the several bars to the space beneath the lower spacing element 13.

The top divider or spacing element 12 consists of a rectangular frame 12$^a$ which is open at 18 to permit of the escape of gases generated in the battery and the side members of which are notched at intervals as indicated at 19. The alternate notches upon each side of the frame 12$^a$ are extended upwardly to the upper face of said frame as indicated at 19$^a$ for the passage of the extensions 6$^a$ and 9$^a$ by which the negative and positive plates are connected to the straps 7 and 10. This construction brings the upper surface of the top divider or spacing element 12 below the plane of the lower surface of the straps 7 and 10 so that when the parts are in assembled relation the inner edges of these straps overlie the upper surface of the top divider. The depending portions or teeth 12$^b$ of the side members of the frame 12ª lie between the plates at the upper portions thereof and hold said plates in properly spaced relation. The top and bottom dividers 12 and 13 may be made of any suitable material such as fiber, glass, wood, hard rubber, celluloid of any other insulating material.

After the parts are brought to the assembled relation shown in Figs. 1 and 2 a hard rubber top indicated at 5ª is placed in position and sealed in the customary manner. Thus it will be seen that all possibility of vibration or moving around of the plates in the battery jar is prevented. While the plates may be of any size they are preferably made higher and shallower than the plates at present in use, which are usually almost square. Furthermore, I prefer to make the plates in my battery considerably thicker than the ordinary plates. These plates will be about five thirty-seconds of an inch thick. This renders it possible to use a heavier grid and prevent the plates from buckling.

By placing the plates crosswise of the battery jar and increasing the height of the plates the capacity is maintained while at the same time more room is provided so that the plates may be spaced farther apart. A battery of that nature is disclosed and claimed in my copending application Serial No. 440,029 above referred to.

It is to be understood that the invention is not limited to the precise construction set forth but that it includes within its purview whatever changes fairly come within either the terms or the spirit of the appended claims.

Having described my invention, what I claim is—

1. A device of the character described comprising a battery jar, a plurality of spaced positive and negative plates therein, spaced connecting straps for the positive and negative plates respectively and an upper spacing element consisting of a rectangular frame, the side members of which are notched for the reception of the edges of said plates said element being of such width as to underlie the straps when the plates are in assembled position.

2. A device of the character described comprising a battery jar, a plurality of spaced positive and negative plates therein and a bottom spacing element comprising a rectangular frame and a plurality of spaced transverse bars having plate receiving grooves in their upper faces, the spaces between said bars extending entirely through the spacing element and the upper edges of said bars being reduced to form inclined surfaces for directing sediment through the spaces between said bars.

3. A device of the character described comprising a battery jar, a plurality of spaced positive and negative plates therein, a pair of connecting straps one disposed along each side of the jar, one of said straps being connected to the positive plate by reduced extension upon said plate and the other of said straps being connected to the negative plate by reduced extensions upon said plates and an upper spacing element consisting of a rectangular frame lying between the reduced extensions of the plates and the lower face of which is notched for the reception of the upper edges of the plates, said element being of such width that its outer edges project beneath and are held against vertical movement by the spaced connecting straps.

In testimony whereof I hereunto affix my signature.

W. LAWRENCE GILL.